US010090592B2

(12) United States Patent
Yajima et al.

(10) Patent No.: US 10,090,592 B2
(45) Date of Patent: Oct. 2, 2018

(54) COMMUNICATION DEVICE

(71) Applicants: Sonitus Technologies Inc., San Mateo, CA (US); Panasonic Intellectual Property Management Co., Ltd., Osaka (JP)

(72) Inventors: Hiroshi Yajima, Osaka (JP); Hiroyuki Satou, Osaka (JP); Shinichiro Ito, Osaka (JP); Bob Fowler, Danville, CA (US); Michael Pare, San Carlos, CA (US); Chris Pontiga, San Jose, CA (US)

(73) Assignees: SONITUS TECHNOLOGIES INC., San Mateo, CA (US); PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 14/926,452

(22) Filed: Oct. 29, 2015

(65) Prior Publication Data
US 2017/0125904 A1 May 4, 2017

(51) Int. Cl.
| | |
|---|---|
| *H01Q 7/06* | (2006.01) |
| *H02J 7/02* | (2016.01) |
| *H02J 50/12* | (2016.01) |
| *H02J 7/00* | (2006.01) |
| *H02J 50/10* | (2016.01) |
| *H02J 50/70* | (2016.01) |
| *H04B 5/00* | (2006.01) |

(52) U.S. Cl.
CPC ............ *H01Q 7/06* (2013.01); *H02J 7/0042* (2013.01); *H02J 7/025* (2013.01); *H02J 50/10* (2016.02); *H02J 50/12* (2016.02); *H02J 50/70* (2016.02); *H04B 5/0037* (2013.01); *H04B 5/0087* (2013.01); *H04B 5/0031* (2013.01)

(58) Field of Classification Search
CPC .......... H01Q 7/06; H01Q 13/24; H01Q 19/09; H02J 7/02; H02J 7/025; H02J 7/0052; H02J 50/12; H02J 50/00–50/90; H02J 7/0025; G06K 7/10178; G06K 19/07794
USPC ........................................................ 343/720
See application file for complete search history.

(56) References Cited

U.S. PATENT DOCUMENTS

| | | | | |
|---|---|---|---|---|
| 9,582,693 | B2* | 2/2017 | Yosui | H01Q 7/06 |
| 9,698,632 | B2* | 7/2017 | Davison | H02J 50/60 |
| 9,825,482 | B2* | 11/2017 | Hyun | H02J 50/40 |
| 2007/0232877 | A1* | 10/2007 | He | A61B 5/14532 |
| | | | | 600/365 |

(Continued)

FOREIGN PATENT DOCUMENTS

JP        2013-98846        5/2013

*Primary Examiner* — Dameon E Levi
*Assistant Examiner* — Jennifer F Hu
(74) *Attorney, Agent, or Firm* — Wenderoth, Lind & Ponack, L.L.P.

(57) ABSTRACT

A communication device includes: a board having a first surface, a second surface opposite to the first surface, and a third surface different from both the first surface and the second surface; a first magnetic sheet disposed on a side of the first surface; a first coil disposed on the first magnetic sheet; a second magnetic sheet disposed on a side of the second surface; a second coil disposed on the second magnetic sheet; and a third coil disposed on the third surface. A part of the first magnetic sheet overlaps at least a part of the third coil in plan view.

12 Claims, 5 Drawing Sheets

(56) References Cited

U.S. PATENT DOCUMENTS

| | | | | |
|---|---|---|---|---|
| 2012/0007787 | A1* | 1/2012 | Schantz | G01S 5/14 343/788 |
| 2012/0306714 | A1* | 12/2012 | Yosui | H01Q 1/2208 343/788 |
| 2013/0050035 | A1* | 2/2013 | Kato | H01Q 1/52 343/741 |
| 2013/0075477 | A1* | 3/2013 | Finn | G06K 19/07794 235/492 |
| 2013/0135172 | A1* | 5/2013 | Ito | G06K 19/07794 343/867 |
| 2013/0181876 | A1* | 7/2013 | Miura | G06K 7/10316 343/788 |
| 2014/0152405 | A1* | 6/2014 | Huh | H04B 5/0093 333/24 R |
| 2014/0168019 | A1* | 6/2014 | Hirobe | H01Q 5/40 343/720 |
| 2014/0176382 | A1* | 6/2014 | Nakano | H01Q 1/243 343/788 |
| 2014/0203976 | A1* | 7/2014 | Yosui | H01Q 7/08 343/702 |
| 2014/0342778 | A1* | 11/2014 | Locher | G06K 7/10178 455/558 |
| 2014/0375262 | A1* | 12/2014 | Yamaguchi | H02J 7/025 320/108 |
| 2015/0054455 | A1* | 2/2015 | Kim | H02J 17/00 320/108 |
| 2015/0171519 | A1* | 6/2015 | Han | H01Q 1/38 343/720 |
| 2015/0279554 | A1* | 10/2015 | Ryoson | H01Q 7/06 343/788 |
| 2015/0288054 | A1* | 10/2015 | Orihara | H01Q 1/243 343/702 |
| 2015/0303573 | A1* | 10/2015 | Tomonari | H01Q 7/00 343/788 |

* cited by examiner

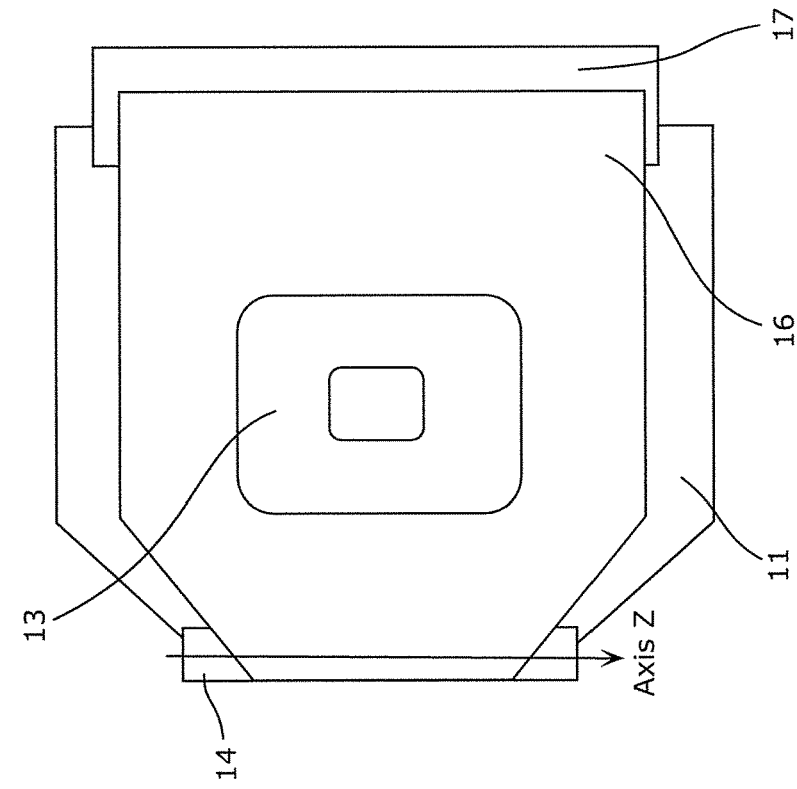
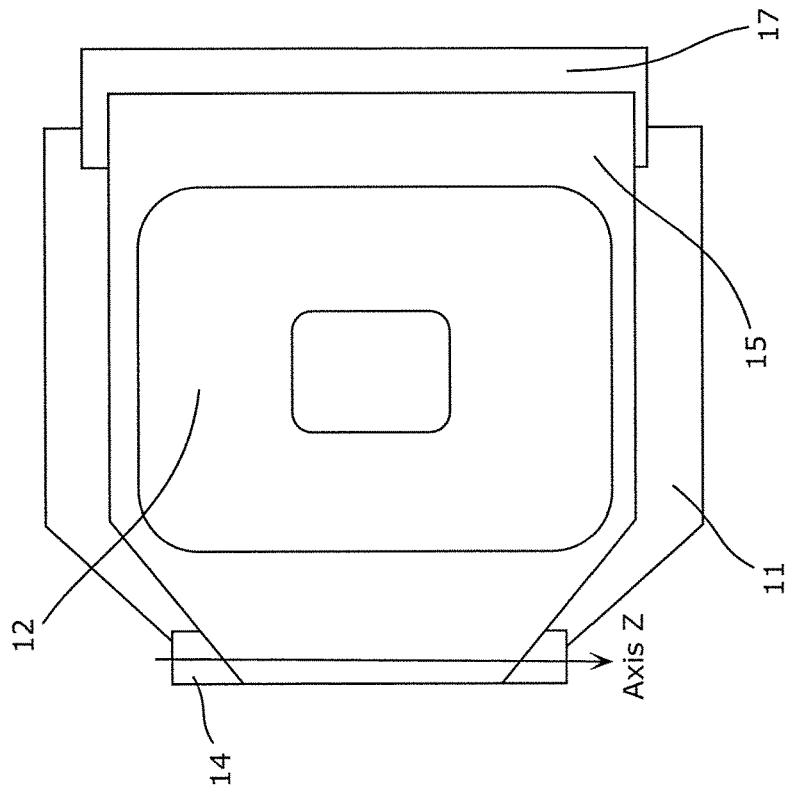

COMMUNICATION DEVICE

FIELD

The present invention relates to wearable communication devices mainly used within the oral cavity.

BACKGROUND

In recent years, there has been increasing demand for wireless terminals to include a function of charging a battery by wirelessly transmitting electric power (wireless charging) or a function of near-field radio communication such as near-field communication (NFC). The wireless charging and NFC functions are generally implemented by using coils. Accordingly, a plurality of coils need to coexist in a device. However, simply arranging the coils close to each other degrades performances, such as power transmission efficiency and communication distance, due to the electromagnetic coupling between the coils.

As an example where two coils serving as a near-field radio communication coil and a wireless power transmission coil coexist, Patent Literature (PTL) 1 discloses an arrangement in which a first magnetic body, a first coil, a second magnetic body, and a second coil are sequentially stacked on a board. Such an arrangement reduces the electromagnetic coupling between the coils, and suppresses degradation in performance caused due to the electromagnetic coupling.

CITATION LIST

Patent Literature

[PTL 1] Japanese Unexamined Patent Application Publication No. 2013-98846

SUMMARY

Technical Problem

The near-field radio communication coil disclosed in PTL 1 is for use in a mobile wireless terminal such as a mobile phone terminal and a smart phone. Hence, the device has a relatively large space for components. In contrast, the wearable communication device placed within the oral cavity as described in the present invention is required to have not only coils, but also components such as a battery and other electronic components modularized. Hence, the wearable communication device is required to be further miniaturized.

An object of the present invention is to provide a communication device miniaturized to be used within a narrow space such as the oral cavity.

Solution to Problem

In order to achieve the above object, an aspect of the present invention is a communication device which includes: a board having a first surface, a second surface opposite to the first surface, and a third surface different from both the first surface and the second surface; a first magnetic sheet disposed on a side of the first surface; a first coil disposed on the first magnetic sheet; a second magnetic sheet disposed on a side of the second surface; a second coil disposed on the second magnetic sheet; and a third coil disposed on the third surface. A part of the first magnetic sheet overlaps at least a part of the third coil in plan view.

Advantageous Effects

According to the present invention, a plurality of coils, magnetic sheets, and a battery can be integrated into a single module, which facilitates miniaturization of the communication device.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 4A is a top view of the communication device according to Embodiment 1.

FIG. 4B is a bottom view of the communication device according to Embodiment 1.

DESCRIPTION OF EMBODIMENT

Hereinafter, an embodiment will be described in detail with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the attached drawings and the following description are provided so that those skilled in the art can fully understand this disclosure. Therefore, the drawings and description are not intended to limit the subject defined by the claims.

Embodiment 1

Hereinafter, Embodiment 1 will be described with reference to FIG. 1 to FIG. 5.

Figure 1:
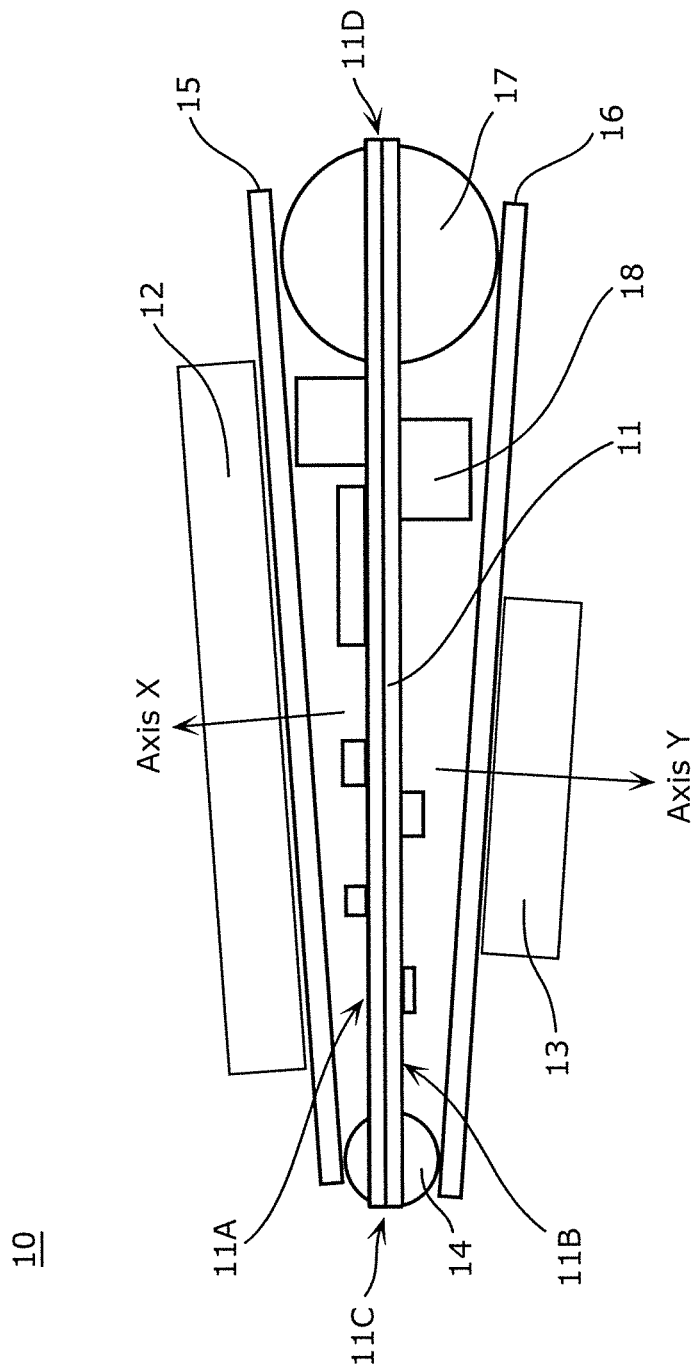
FIG. 1 is a schematic view of a communication device according to Embodiment 1.
Figure 2B:
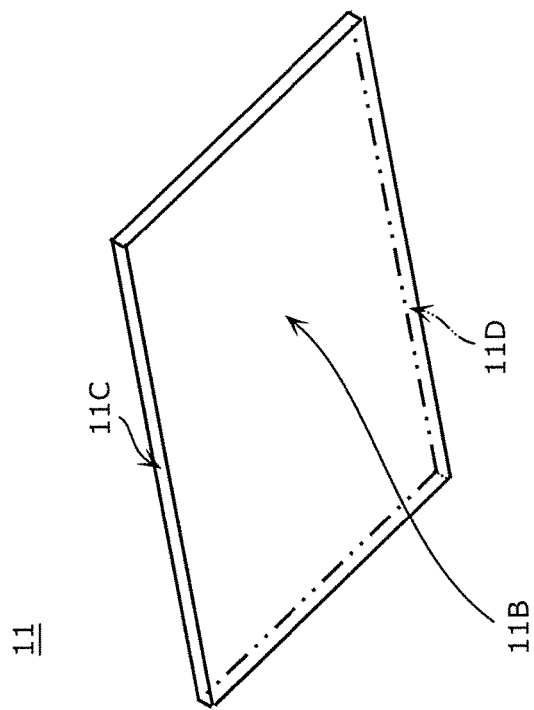
FIG. 2B is a schematic perspective view of the board according to Embodiment 1, seen from the second surface side of the board.
Figure 2A:
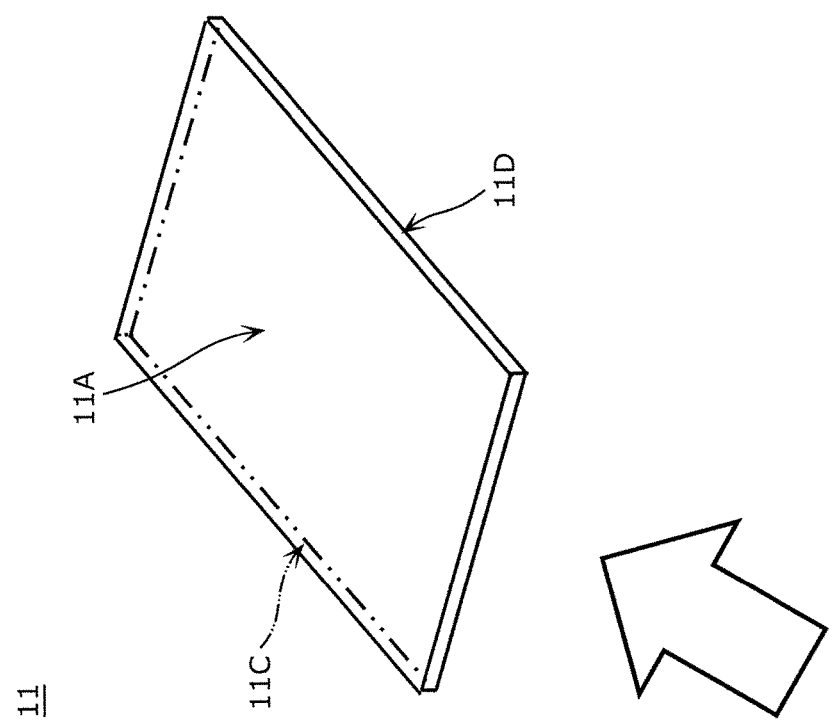
FIG. 2A is a schematic perspective view of a board according to Embodiment 1, seen from the first surface side of the board.
Figure 3B:
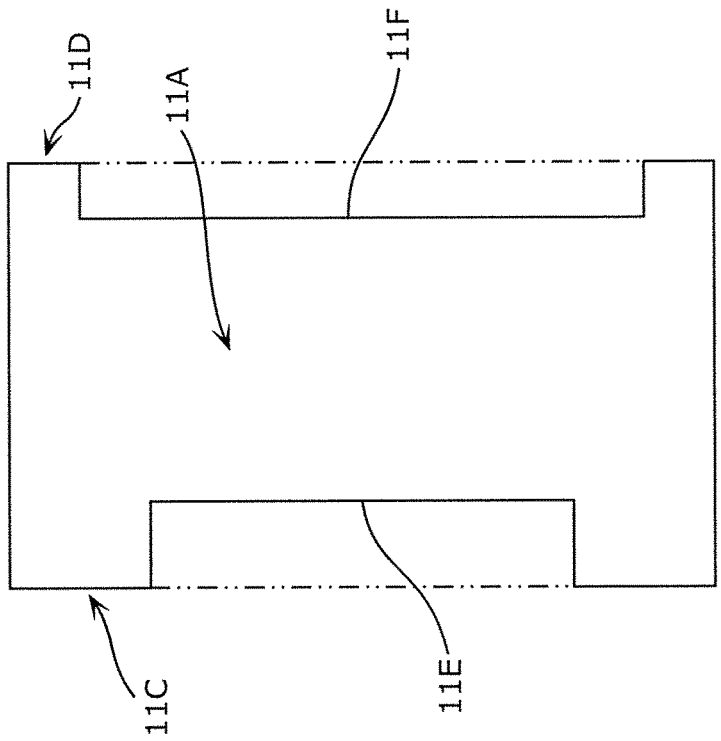
FIG. 3B is a top view of a board according to another aspect of Embodiment 1.
Figure 3A:
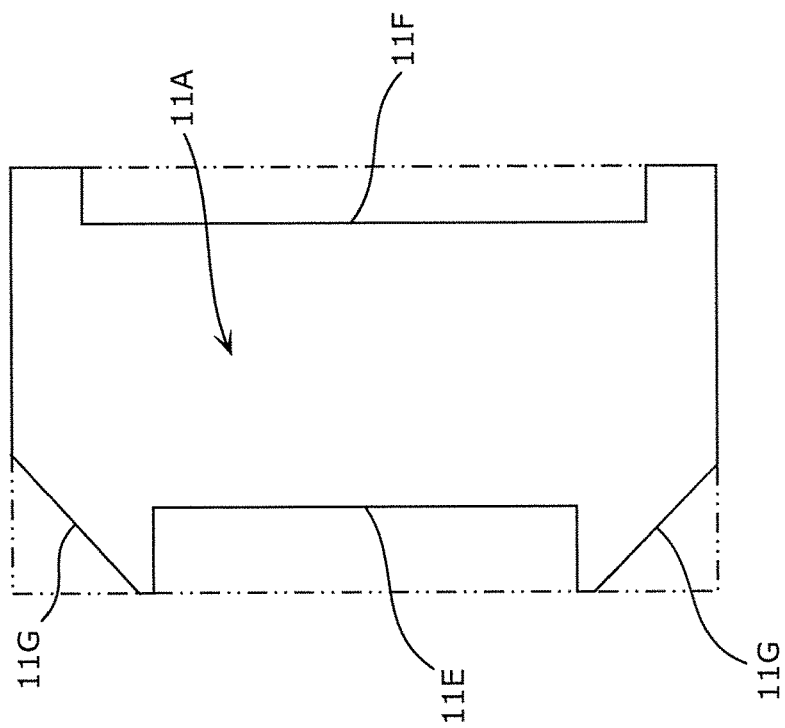
FIG. 3A is a top view of the board according to Embodiment 1.
Figure 5:
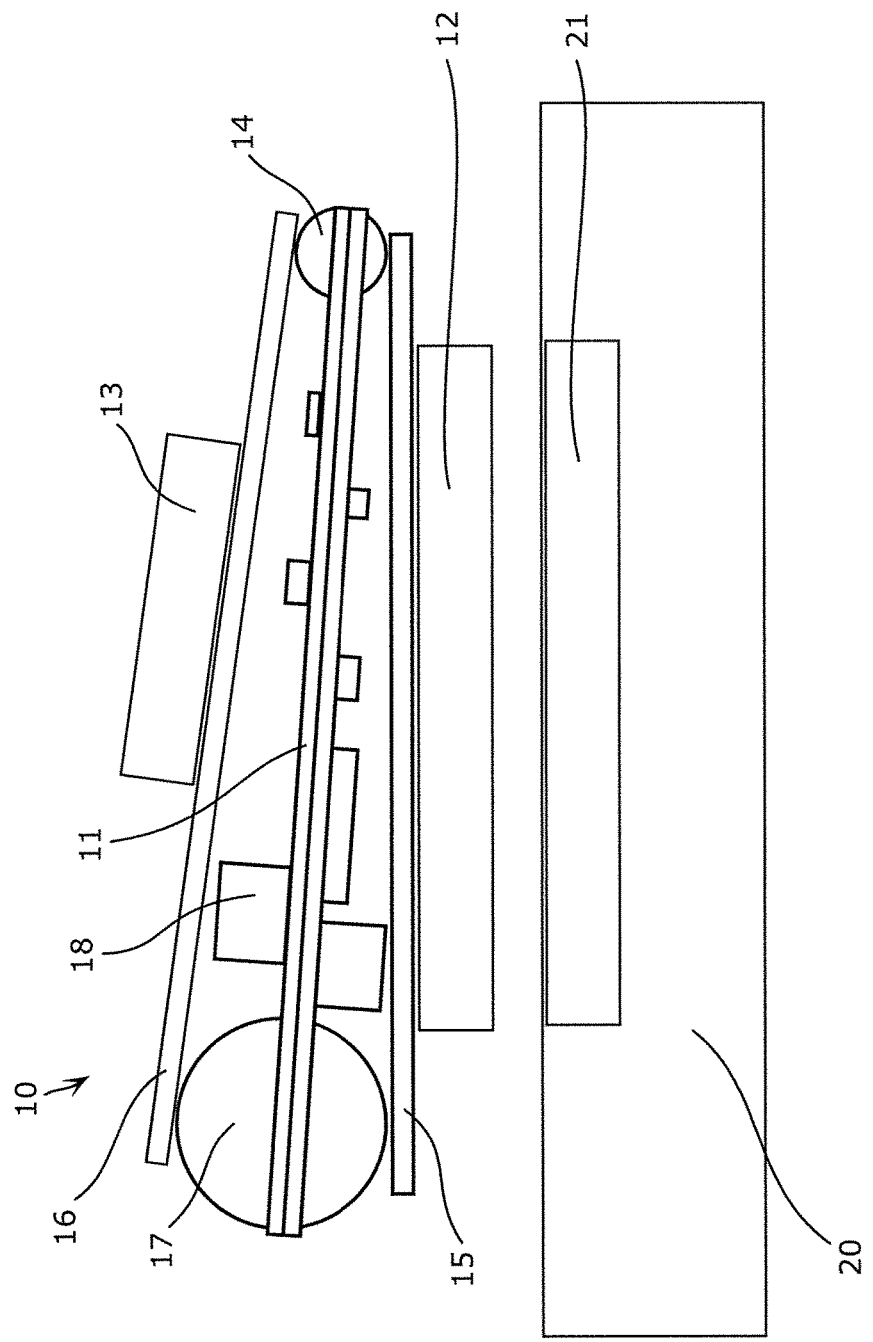
FIG. 5 is a schematic view of a state where the communication device and a charger are combined, according to Embodiment 1.

FIG. 1 is a schematic view of a communication device 10. The schematic view of FIG. 1 illustrates a board 11 seen from the direction as indicated by the thick arrow in FIG. 2A. FIG. 2A is a schematic perspective view of the board 11 seen from the first surface 11A side of the board 11. FIG. 2B is a schematic perspective view of the board 11 seen from the second surface 11B side of the board 11. FIG. 3A and FIG. 3B each are a top view of the board 11 seen from the first surface 11A side. FIG. 4A is a top view of the communication device 10, and FIG. 4B is a bottom view of the communication device 10. FIG. 5 is a schematic view of a state where the communication device 10 and a charger 20 are combined.

In the following description, the term "plan view" refers to a view seen from the top surface side (or the bottom surface side).

[Description of the Board 11]

The board 11 is a printed circuit board for an electronic circuit having a plan view shape that is substantially cuboid. As FIG. 2A and FIG. 2B illustrate, of six surfaces of the substantially cuboid shape, components of the communication device 10 are mounted on the four surface sides including the first surface 11A side to a fourth surface 11D side. Here, a first surface 11A is a front surface of the printed circuit board. A second surface 11B is a surface opposite to the first surface 11A. A third surface 11C is one of the lateral surfaces of the printed circuit board and includes the longitudinal direction of the first surface 11A. The fourth surface 11D is a surface opposite to the third surface 11C. In view of the fact that the communication device 10 including the board 11 is mounted within the oral cavity, the longitudinal length of the board 11 is, for example, approximately 25 mm.

Components included in the communication device 10 are mounted on the first surface 11A side to the fourth surface 11D side of the board 11. In Embodiment 1, the components are disposed on the respective surface sides as below.

A first magnetic sheet 15 and a first coil 12 are disposed on the first surface 11A side.

A second magnetic sheet 16 and a second coil 13 are disposed on the second surface 11B side.

A third coil 14 is disposed on the third surface 11C side.

A battery 17 is disposed on the fourth surface 11D side.

Here, as FIG. 3B illustrates, for example, the third surface 11C has a first notched part 11E and the fourth surface 11D has a second notched part 11F so that the third coil 14 is disposed on the first notched part 11E and the battery 17 is disposed on the second notched part 11F. Such a configuration further miniaturizes the communication device 10 including the board 11.

In Embodiment 1, the longitudinal length of the third coil 14 is shorter than the longitudinal length of the battery 17. Accordingly, matching the length of the first notched part 11E with the longitudinal length of the third coil 14 allows the length of the first notched part 11E to be shorter than the length of the second notched part 11F.

Such a configuration generates surplus spaces at the corner portions of the third surface 11C side (the left side in FIG. 3B). Removal of the spaces allows the device to be further miniaturized. In other words, as FIG. 3A illustrates, the board 11 illustrated in FIG. 3B can have two third notched parts 11G. Such a configuration further miniaturizes the communication device 10 including the board 11, allowing the communication device 10 to have a shape which facilitates placement of the communication device 10 within the oral cavity.

In the following description, it is assumed that the board 11 has the shape illustrated in FIG. 3A.

[Configuration of the Communication Device 10]

As FIG. 1 illustrates, the communication device 10 includes: the board 11 which is a printed electronic circuit; the first coil 12 for wireless charging disposed on the first surface 11A side of the board 11; the second coil 13 for NFC disposed on the second surface 11B side of the board 11; the third coil 14 for near field magnetic induction (NFMI) disposed on the third surface 11C side of the board 11; and the first magnetic sheet 15 and the second magnetic sheet 16 having quadrilateral plate shapes. For example, electronic components 18 such as micro electrical mechanical systems (MEMS) microphone may be disposed on the first surface 11A and the second surface 11B of the board 11.

The first magnetic sheet 15 is disposed on the first surface 11A side of the board 11. The first coil 12 is disposed on the top surface side of the first magnetic sheet 15 in FIG. 1 so as to be substantially parallel to the top surface of the first magnetic sheet 15 (the first coil 12 may intersect with the top surface of the first magnetic sheet 15 at an angle ranging from approximately −10 degrees to +10 degrees).

The second magnetic sheet 16 is disposed on the second surface 11B side of the board 11. The second coil 13 is disposed on the bottom surface side of the second magnetic sheet 16 in FIG. 1 so as to be substantially parallel to the bottom surface of the second magnetic sheet 16 (the second coil 13 may intersect with the bottom surface of the second magnetic sheet 16 at an angle ranging from approximately −10 degrees to +10 degrees).

Accordingly, an axis X of the first coil 12 and an axis Y of the second coil 13 are substantially parallel to each other (the axis X of the first coil 12 and the axis Y of the second coil 13 may intersect with each other at an angle ranging from approximately −20 degrees to +20 degrees. For example, the angle ranges from −10 degrees to +10 degrees). Moreover, the axis X and the axis Y intersect with an axis Z of the third coil 14 (illustrated in FIG. 4A) substantially orthogonally (at an angle ranging from approximately 75 degrees to 105 degrees).

Such a configuration allows a communication device to be miniaturized to the extent that the communication device can be used within the oral cavity.

[Description of the First Coil 12]

In Embodiment 1, the first coil 12 is, for example, a power transmission communication coil intended for wireless charging. The first coil 12 is a thin coil obtained by winding a conductive winding wire in an elliptical ring shape. As FIG. 5 illustrates, the first coil 12 is disposed to face a charging unit 21 of the charger 20.

Here, in wireless charging, presence of a metal (such as a battery housing or a printed circuit board) near a coil on the power receiving side generates an eddy current which flows against the change of magnetic flux from the power supplying side (charger). This generates reaction flux. It is generally known that such an eddy current generates induction heating and that the reaction flux may hinder proper wireless power supply.

In view of this, the first coil 12 is disposed above the first magnetic sheet 15 in FIG. 1. As FIG. 4A illustrates, the area of the first magnetic sheet 15 is larger than the area of the first coil 12.

Such a configuration allows the magnetic flux from the power supplying side to concentrate in the first magnetic sheet 15, suppressing the eddy current. As a result, heat generation is suppressed. Moreover, since magnetic loss is reduced, the charging efficiency on the power supplying side increases.

[Description of the Second Coil 13]

In Embodiment 1, the second coil 13 is, for example, an NFC communication coil which uses radio waves in the 13.56 MHz band and which is intended for pairing devices. The second coil 13 is a thin coil obtained by winding a conductive winding wire in an elliptical ring shape. The second coil 13 has a diameter smaller than the diameter of the first coil 12.

Here, in NFC communication, presence of a metal (such as a battery housing or a printed circuit board) near a coil on the receiving side generates an eddy current which flows against the change of magnetic flux from the transmitting side (reader and writer). This generates reaction flux. It is generally known that the reaction flux suppresses the magnetic field necessary for communication and the suppression may result in a communication failure.

In view of this, the second coil 13 is disposed below the second magnetic sheet 16 in FIG. 1. As FIG. 4B illustrates, the area of the second magnetic sheet 16 is larger than the area of the second coil 13.

Such a configuration allows the magnetic flux from the reader and writer to concentrate in the second magnetic sheet 16, suppressing the eddy current. This reduces magnetic loss, leading to an improved communication distance.

[Description of the Third Coil 14]

In Embodiment 1, the third coil 14 is, for example, an NFMI communication coil. NFMI communication is performed between the communication device 10 placed within the oral cavity and a wireless device (not illustrated) placed outside the oral cavity. The third coil 14 is a coil which is axially long.

In order to obtain the advantageous effects similar to those of the second coil 13, for example, a dedicated magnetic sheet is also provided for the third coil 14. However, in Embodiment 1, the similar advantageous effects can be obtained by sharing the first magnetic sheet 15 without providing a dedicated magnetic sheet.

Specifically, the third coil 14 is disposed below the first magnetic sheet 15, and above the second magnetic sheet 16 in FIG. 1. As FIG. 4A illustrates, the third coil 14 is partially covered with the first magnetic sheet 15.

Such a configuration reduces the number of necessary components, and allows the space to be efficiently used. This leads to miniaturization of the communication device 10.

Moreover, no additional component is required, leading to a reduction in cost.

As FIG. 4B illustrates, the third coil 14 may be partially covered with the second magnetic sheet 16, in addition to the first magnetic sheet 15. Covering the third coil 14 with the first magnetic sheet 15 and the second magnetic sheet 16 allows the direction of the magnetic flux passing through the third coil 14 to be controlled. Hence, an advantageous effect of increasing the directivity in the axial direction of the NFMI communication antenna is also expected.

FIG. 4A and FIG. 4B illustrate that the third coil 14 is partially covered with the first magnetic sheet 15 and the second magnetic sheet 16; however, the third coil 14 may be entirely covered with the first magnetic sheet 15 and the second magnetic sheet 16. This further improves the directivity.

[Description of the Battery 17]

The battery 17 used in Embodiment 1 is a secondary battery having a substantially tubular shape. The battery 17 is disposed on an end portion of the fourth surface 11D of the board 11 such that the longitudinal direction of the battery 17 is substantially parallel to the longitudinal direction of the board 11. In Embodiment 1, the battery 17 is disposed on the second notched part 11F in FIG. 3A.

In Embodiment 1, as an example, a pin-shaped lithium-ion battery having a diameter of approximately 4 mm and a length of approximately 20 mm is used as the battery 17. However, of course, the battery 17 is not limited to the example.

When the battery 17 has a magnetic housing, the temperature of the battery 17 may increase due to induction heating. In view of this, in Embodiment 1, as FIG. 1 illustrates, the battery 17 is disposed between the first magnetic sheet 15 and the second magnetic sheet 16. In plan view, as FIG. 4A and FIG. 4B illustrate, the first magnetic sheet 15 and the second magnetic sheet 16 are disposed so as to cover the lateral surfaces of the battery 17.

This reduces the density of a magnetic line passing through the housing of the battery 17, reduces the influences of induction heating, and suppresses an increase in temperature of the battery 17.

As described above, covering the battery 17 with the first magnetic sheet 15 and the second magnetic sheet 16 eliminates the need for a dedicated magnetic sheet for the battery 17. This allows the communication device 10 to be miniaturized at low cost.

In FIG. 4A and FIG. 4B, the battery 17 is partially covered; however, the battery 17 may be entirely covered. This further increases the suppressing effect of the temperature increase of the battery 17.

Embodiment 1 has described an example where the battery 17 is covered with the first magnetic sheet 15 and the second magnetic sheet 16. As described above, the diameter of the first coil 12 is larger than the diameter of the second coil 13, and thus, the first coil 12 receives larger influence of induction heating. Accordingly, it may be that only the first magnetic sheet 15 covers a lateral surface of the battery 17.

[Description of Magnetic Sheets]

Examples of the first magnetic sheet 15 and the second magnetic sheet 16 include an Ni—Zn ferrite sheet, an Mn—Zn ferrite sheet, and an Mg—Zn ferrite sheet.

It is generally known that the Mn—Zn ferrite sheet has high efficiency at low frequencies, and the Ni—Zn ferrite sheet has high efficiency at high frequencies. Accordingly, in Embodiment 1, an Mn—Zn ferrite sheet is used as the first magnetic sheet 15 for wireless charging in which power transmission is performed at a frequency ranging from approximately 100 kHz to 200 kHz, and an Ni—Zn ferrite sheet is used as the second magnetic sheet 16 for NFC communication in which communication is performed at a frequency of approximately 13.56 MHz.

In Embodiment 1, ferrite is used as a magnetic material as an example; however, any other material which exhibits similar properties may be used.

Although only an exemplary embodiment of the present invention have been described in detail above, those skilled in the art will readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The present invention is useful for small communication devices in which a plurality of coils, a battery and the like are integrated on a board, in particular, useful for various wearable devices such as intraoral tissue conduction microphone devices, and hearing aid devices.

The invention claimed is:

1. A communication device comprising:
a board having a first surface, a second surface opposite to the first surface, and a third surface different from both the first surface and the second surface;
a first magnetic sheet disposed on a side of the first surface;
a first coil disposed on the first magnetic sheet;
a second magnetic sheet disposed on a side of the second surface;
a second coil disposed on the second magnetic sheet; and
a third coil disposed on the third surface, wherein a first part of the first magnetic sheet overlaps at least a part of the third coil in plan view.

2. The communication device according to claim 1, wherein
the first coil is a wireless charging coil,
the second coil is a near-field communication (NFC) coil, and
the third coil is a near-field magnetic induction (NFMI) coil.

3. The communication device according to claim 2, further comprising:
a battery, wherein
the board has a fourth surface opposite to the third surface,
the battery is disposed on the fourth surface, and
a second part of the first magnetic sheet overlaps at least a part of the battery in plan view.

4. The communication device according to claim 2, wherein
the third coil is disposed on a first notched part on the third surface.

5. The communication device according to claim 2, further comprising:
a battery, wherein
the board has a fourth surface, and the battery is disposed on a second notched part on the fourth surface.

6. The communication device according to claim 2, wherein
an area of the first coil is larger than an area of the second coil in plan view, and
a part of the first coil overlaps at least a part of the second coil in plan view.

7. The communication device according to claim 2, further comprising;
at least one electric component, wherein
the at least one electric component is disposed between the first surface and the first magnetic sheet or between the second surface and the second magnetic sheet, and
a part of the at least one electric component overlaps at least a part of the first coil in plan view.

8. The communication device according to claim 2, wherein
the first magnetic sheet and the second magnetic sheet include ferrite.

9. The communication device according to claim 2, wherein
the board is a printed circuit board.

10. The communication device according to claim 2, wherein
the first coil is disposed to face a charging unit of a charger for charging of the communication device.

11. The communication device according to claim 1, wherein
an axis of the first coil is substantially parallel to an axis of the second coil.

12. The communication device according to claim 11, wherein
each the axis of the first coil and the axis of the second coil intersects with an axis of the third coil.

* * * * *